United States Patent
Milgate, Jr. et al.

(10) Patent No.: US 6,852,441 B2
(45) Date of Patent: Feb. 8, 2005

(54) REINFORCEMENT OF MULTIPLE ELECTROCHEMICAL CELL FRAMES FOR HIGH-PRESSURE OPERATION

(75) Inventors: Robert W. Milgate, Jr., Gloucester, MA (US); William A. Titterington, River Ranch, FL (US)

(73) Assignee: Giner Electrochemical Systems, LLC, Newton, MA (US)

(*) Notice: Subject to any disclaimer, the term of this patent is extended or adjusted under 35 U.S.C. 154(b) by 188 days.

(21) Appl. No.: 10/023,428

(22) Filed: Dec. 17, 2001

(65) Prior Publication Data

US 2003/0113607 A1 Jun. 19, 2003

(51) Int. Cl.[7] ............................................. H01M 8/04
(52) U.S. Cl. ........................... 429/39; 429/34; 429/38
(58) Field of Search ........................... 429/34, 38, 39; 204/194, 253

(56) References Cited

U.S. PATENT DOCUMENTS

| | | | |
|---|---|---|---|
| 4,692,391 A | | 9/1987 | Hirota |
| 5,009,968 A | | 4/1991 | Guthrie et al. |
| 5,316,644 A | | 5/1994 | Titterington et al. |
| 5,324,565 A | | 6/1994 | Leonida et al. |
| 5,350,496 A | | 9/1994 | Smith et al. |
| 5,366,823 A | | 11/1994 | Leonida et al. |
| 5,466,354 A | | 11/1995 | Leonida et al. |
| 5,547,777 A | * | 8/1996 | Richards ........................ 429/32 |
| 5,789,091 A | * | 8/1998 | Wozniczka et al. ............ 429/12 |
| 6,057,053 A | | 5/2000 | Gibb |
| 6,218,039 B1 | * | 4/2001 | Mease et al. ................... 429/37 |
| 6,322,920 B1 | * | 11/2001 | Tomson ........................ 429/34 |
| 6,500,319 B2 | | 12/2002 | LaConti et al. |

OTHER PUBLICATIONS

Coker et al., "Industrial and Government Applications of SPE Fuel Cell and Electrolyzers," presented at The Case Western Symposium on "Membranes and Ionic and Electronic Conducting Polymer," May 17–19, 1982, Cleveland, Ohio.

* cited by examiner

Primary Examiner—Carol Chaney
(74) Attorney, Agent, or Firm—Kriegsman & Kriegsman (57) ABSTRACT

Electrochemical cell stack comprises, in one embodiment, a plurality of cells arranged in series in a bipolar configuration, each cell including a proton exchange membrane (PEM), an anode positioned along one face of the PEM, and a cathode positioned along the other face of the PEM. A multi-layer metal screen for defining a first fluid cavity is placed in contact with the outer face of the anode, and an electrically-conductive, spring-like, porous pad for defining a second fluid cavity is placed in contact with the outer face of the cathode. The porous pad comprises a mat of carbon fibers having a density of about 0.2–0.55 g/cm$^3$. Cell frames are placed in peripheral contact with the metal screen and the compression pad for peripherally containing fluids present therewithin. Electrically-conductive separators are placed in contact with the metal screen and the compression pad for axially containing fluids present therewithin. A reinforcing cylinder made of metal or rigid plastic peripherally surrounds the plurality of cells and provides structural support to the cell frames as they expand radially due to increasing temperature and/or internal fluid pressure.

23 Claims, 6 Drawing Sheets

REINFORCEMENT OF MULTIPLE ELECTROCHEMICAL CELL FRAMES FOR HIGH-PRESSURE OPERATION

BACKGROUND OF THE INVENTION

The present invention relates generally to proton exchange membrane (PEM) electrochemical cell stacks and relates more particularly to a novel PEM electrochemical cell stack.

In certain controlled environments, such as those found in airplanes, submarines and spacecrafts, it is often necessary for oxygen to be furnished in order to provide a habitable environment. An electrolysis cell, which uses electricity to convert water to hydrogen and oxygen, represents one type of device capable of producing quantities of oxygen. One common type of electrolysis cell comprises a proton exchange membrane, an anode positioned along one face of the proton exchange membrane, and a cathode positioned along the other face of the proton exchange membrane. To enhance electrolysis, a catalyst, such as platinum, is typically present both at the interface between the anode and the proton exchange membrane and at the interface between the cathode and the proton exchange membrane. The above-described combination of a proton exchange membrane, an anode, a cathode and associated catalysts is commonly referred to in the art as a membrane electrode assembly.

In use, water is delivered to the anode and an electric potential is applied across the two electrodes, thereby causing the electrolyzed water molecules to be converted into protons, electrons and oxygen atoms. The protons migrate through the proton exchange membrane and are reduced at the cathode to form molecular hydrogen. The oxygen atoms do not traverse the proton exchange membrane and, instead, form molecular oxygen at the anode. (An electrolysis cell, when operated in reverse to generate water and electricity using molecular hydrogen and molecular oxygen as starting materials, is referred to in the art as a fuel cell. Electrolysis cells and fuel cells both constitute electrochemical cells, and all discussion herein pertaining to electrolysis cells is correspondingly applicable to fuel cells.)

Often, a number of electrolysis cells are assembled together in order to meet hydrogen or oxygen production requirements. One common type of assembly is a stack comprising a plurality of stacked electrolysis cells that are electrically connected in series in a bipolar configuration. In a typical stack, each cell includes, in addition to a membrane electrode assembly of the type described above, a pair of multi-layer metal screens, one of said screens being in contact with the outer face of the anode and the other of said screens being in contact with the outer face of the cathode. (In another typical electrolysis cell stack design, the multi-layer metal screen on the anode side is omitted, and the separator is provided with a set of molded or machined grooves for defining a fluid cavity.) The screens are used to form the fluid cavities within a cell for the water, hydrogen and oxygen.

Each cell additionally includes a pair of cell frames, each cell frame peripherally surrounding a screen. The frames are used to peripherally contain the fluids and to conduct the fluids into and out of the screen cavities. Each cell further includes a pair of metal foil separators, one of said separators being positioned against the outer face of the anode screen and the other of said separators being positioned against the outer face of the cathode screen. The separators serve to axially contain the fluids on the active areas of the cell assembly. In addition, the separators and screens together serve to conduct electricity from the anode of one cell to the cathode of its adjacent cell. Plastic gaskets seal the outer faces of the cell frames to the metal separators, the inner faces of the cell frames being sealed to the proton exchange membrane.

The cells of the stack are typically compressed between a spring-loaded rigid top end plate and a bottom base plate. In order to ensure optimal conversion of water to hydrogen and oxygen by each electrolysis cell in a stack, there must be uniform current distribution across the active areas of the electrodes of each cell. Such uniform current distribution requires uniform contact pressure over the active areas of the electrodes. Accordingly, one way in which uniform contact pressure over the entire active areas of the electrodes has been maintained has been to provide an electrically-conductive compression pad between adjacent cells in a stack.

Additional information relating to electrolysis cell stacks includes the following patents and publications, all of which are incorporated herein by reference: U.S. Pat. No. 6,057,053, inventor Gibb, issued May 2, 2000; U.S. Pat. No. 5,466,354, inventors Leonida et al., issued Nov. 14, 1995; U.S. Pat. No. 5,366,823, inventors Leonida et al., issued Nov. 22, 1994; U.S. Pat. No. 5,350,496, inventors Smith et al., issued Sep. 27, 1994; U.S. Pat. No. 5,324,565, inventors Leonida et al., issued Jun. 28, 1994; U.S. Pat. No. 5,316,644, inventors Titterington et al., issued May 31, 1994; U.S. Pat. No. 5,009,968, inventors Guthrie et al., issued Apr. 23, 1991; and Coker et al., "Industrial and Government Applications of SPE Fuel Cell and Electrolyzers," presented at The Case Western Symposium on "Membranes and Ionic and Electronic Conducting Polymer," May 17–19, 1982 (Cleveland, Ohio).

Although electrolysis cell stacks of the type described above have proven to be generally satisfactory for their intended purpose, there still remains room for improvement. One such area in which room for improvement exists is with respect to the above-described cell frames. Such cell frames are typically made of an unfilled plastic, such as polysulfone. Polysulfone cell frames are desirable in that they have good electrical insulating properties, they are chemically inert and they can easily be formed by conventional machining methods or by economical molding or thermo-forming techniques. Unfortunately, however, cell frames made of unfilled plastic materials may be fluid incapable of withstanding the considerable structural stresses imposed by high internal pressures required for some electrochemical cell applications. In addition, high internal fluid pressure can cause excessive expansion of the inside diameter of the frame, which can result in the formation of an alternative fluid path preventing proper water distribution in an electrolysis cell.

One approach to this problem has been to add fillers (typically in the form of a reinforcing cloth or reinforcing fibers) to the plastic material to increase the strength of the cell frame. This approach, however, has the drawback that the fillers often add porosity to the cell frame, allowing cell fluids to wick through the frame via the fillers. Another drawback is that the cell fluids have a tendency to react adversely with the filler materials when they come into contact therewith.

Another approach to this problem has been to enclose the cell frames within a fluid containment pressure vessel and to supply a back pressure against the frame stack using an inert fluid so that the differential pressure between the operating pressure inside the cell frames and the external back pressure outside the cell frames is kept to a minimal level. Unfortunately, however, this approach is complicated, expensive and adds a lot of weight to the cell stack, as well as to systems incorporating such cell stacks.

Still another approach to this problem has been to surround the cell frames with reinforcing rings, with each reinforcing ring surrounding a single cell frame and being spaced apart from its adjacent reinforcing rings. Each of said reinforcing rings is typically made of a metal or a rigid plastic and is fitted to the exterior of the cell frame. One drawback with this approach is that, where the reinforcement rings are made of metal, insulating material must be positioned between adjacent rings so that they do not electrically short across each other. Another drawback is that each ring must be individually secured to its corresponding cell frame and move with it when the stack expands or compresses due to temperature and/or creep.

In some instances, when such rings are very thin and narrow, they may become unstable, causing the outside diameter to "oil can" up or down.

SUMMARY OF THE INVENTION

It is an object of the present invention to provide a novel PEM electrochemical cell stack.

It is another object of the present invention to provide a novel PEM electrochemical cell stack that overcomes at least some of the shortcomings described above in connection with existing PEM electrochemical cell stacks.

It is still another object of the present invention to provide a PEM electrochemical cell stack as described above that has a minimal number of parts, that can readily be mass produced, and that can easily be operated.

According to one aspect of the invention, a reinforcing member is used to peripherally surround a plurality of PEM electrochemical cells in such a way as to provide structural support thereto (and, in particular, to provide support to the constituent cell frames thereof). The reinforcing member is typically sized and shaped to match the size and shape of the exterior surface of the cell frames so that, when the internal operating pressure within the cells and/or the operating temperature increase causes the cell frames to expand, the reinforcing member restricts the strain and reduces the tensile stresses in the frames caused by the high internal pressure. In some cases, the reinforcing member can even convert tensile stresses in the frames to compression stresses. The reinforcing member can also be used to control the expansion of the cell frame in order to maintain physical contact with the fluid compartment screen assemblies to maintain proper water distribution.

In those instances in which the cell frames are cylindrical, the reinforcing member is also cylindrical. The reinforcing member is fitted closely to the outer perimeter of the frames. Preferably, the reinforcing member is made of a metal or a rigid plastic. Where the reinforcing member is made of metal, electrically-insulating material is preferably interposed between the reinforcing member and the cells and along the ends of the reinforcing member. The use of a metal reinforcement with a thermal coefficient of expansion less than that for the frames further enhances the conversion of tensile stresses to compressive stresses as the unit warms up to operating temperature.

The reinforcing member may be provided with a plurality of openings or vents positioned at various points along its length to permit the escape therethrough of any leakage fluids from the cells and to permit access therethrough to the cells for individual cell voltage measurements. Preferably, the vents are dispersed at points around the perimeter of the reinforcing member to minimize any diminution in strength to the reinforcing member.

One advantage of the reinforcing member of the present invention, as compared to the above-described reinforcing rings, is that a single reinforcing member can be used to reinforce the cell frames of a plurality of cells. By comparison, a single reinforcing ring is only capable of reinforcing the cell frames of a single cell or one side of a single cell. Consequently, use of the reinforcing member of the present invention results in a reduction of parts of the cell stack, thereby reducing the cost of manufacturing the cell stack and simplifying assembly of the cell stack.

Another advantage of the reinforcing member of the present invention, as compared to the above-described reinforcing rings, is that the reinforcing member is continuous along its length-unlike the reinforcing rings, which are separated by air gaps. Consequently, the load exerted against the reinforcing member of the present invention can be spread over a larger surface area than is the case with the reinforcing rings. This can result in a smaller outside diameter of the reinforcing member with considerable savings in weight and volume.

Still another advantage of the reinforcing member of the present invention, as compared to the above-described reinforcing rings, is that the electrically-insulating material placed between adjacent rings made of metal to prevent electrical shorting may be replaced by a single, thin, insulating sheet inserted between the frames and the reinforcing member.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
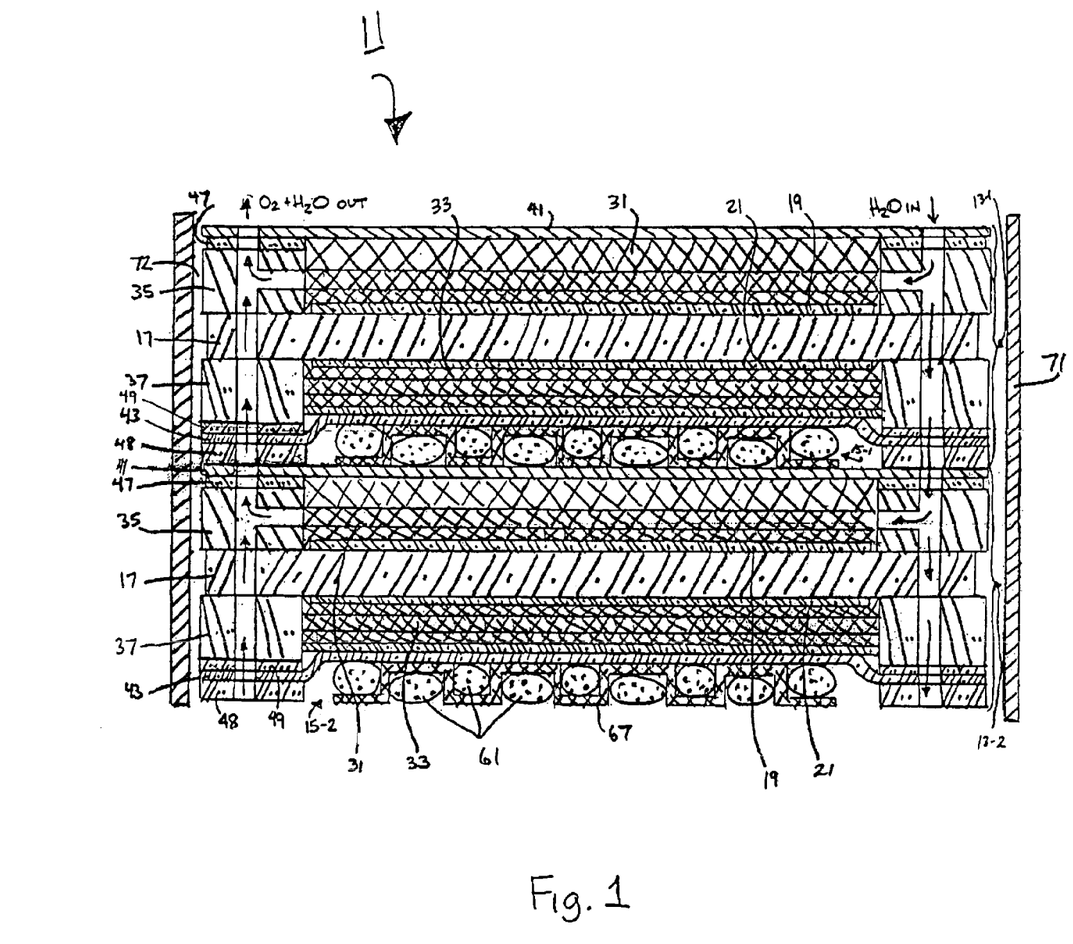
FIG. 1 is a schematic section view of a first embodiment of a PEM electrochemical cell stack constructed according to the teachings of the present invention, the water and oxygen flow paths through the PEM electrochemical cell stack being shown, the hydrogen path through the PEM electrochemical cell stack not being shown.

Referring now to FIG. 1, there is shown a schematic section view of a first embodiment of a PEM electrochemical cell stack constructed according to the teachings of the present invention, said PEM electrochemical cell stack being represented generally by reference numeral 11.

Stack 11 comprises a pair of PEM electrochemical cells 13-1 and 13-2 arranged in series in a bipolar configuration and a pair of compression pads 15-1 and 15-2, compression pad 15-1 being interposed between cells 13-1 and 13-2 for electrically connecting cells 13-1 and 13-2 and for maintaining uniform contact over the active areas of cells 13-1 and 13-2. Although, for purposes of simplicity and clarity, stack 11 is shown in the present embodiment comprising only two cells 13-1 and 13-2 and two compression pads 15-1 and 15-2, it can readily be appreciated that stack 11 may be modified to include as many as one hundred or more cells 13, with each adjacent pair of cells 13 being separated by an interposed compression pad 15.

Each cell 13 includes a proton exchange membrane 17, an anode 19 positioned along one face of proton exchange membrane 17, and a cathode 21 positioned along the other face of proton exchange membrane 17. A platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17.

Each cell 13 also comprises a pair of multi-layer metal screens 31 and 33. Screen 31 is placed in contact with the outer face of anode 19 and is used to define a fluid cavity through which water may pass and in which molecular oxygen generated at anode 19 may be collected. Screen 33 is placed in contact with the outer face of cathode 21 and is used to define a fluid cavity in which molecular hydrogen generated at cathode 21 may be collected.

Each cell 13 additionally comprises a pair of polysulfone cell frames 35 and 37, cell frame 35 peripherally surrounding screen 31 and cell frame 37 peripherally surrounding screen 33. Frames 35 and 37 are used to peripherally contain the fluids present within screens 31 and 33, respectively, and to conduct the fluids into and out of screens 31 and 33, respectively. Each of frames 35 and 37 typically has a thickness of about 0.060 inch.

Each cell 13 further comprises a pair of separators 41 and 43. Separators 41 and 43 are typically made of a metal foil, such as a titanium foil having a thickness of about 0.005 inch. Separator 41 is positioned against the outer face of screen 31. Separator 43 is positioned against the outer face of an electrically-conductive separator plate 45 which, in turn, is positioned against the outer face of screen 33. (Separator plate 45 protects separator 43 from experiencing fretting corrosion caused by contact with screen 33.) Separators 41 and 43 serve to axially contain the fluids within screens 31 and 33, respectively. In addition, separators 41 and 43, separator plate 45, and screens 31 and 33 together serve to conduct electricity from anode 19 of cell 13-1 to cathode 21 of cell 13-2.

Each cell 13 also comprises a trio of plastic gaskets 47, 48 and 49. Gasket 47 seals the outer face of frame 35 to separator 41, gasket 48 seals the fluid ports between separators 41 and 43, and gasket 49 seals the outer face of frame 37 to separator 43. Each of gaskets 47, 48 and 49 typically has a thickness of about 0.005 inch. The inner faces of frames 35 and 37 are sealed to proton exchange membrane 17.

Figure 2:
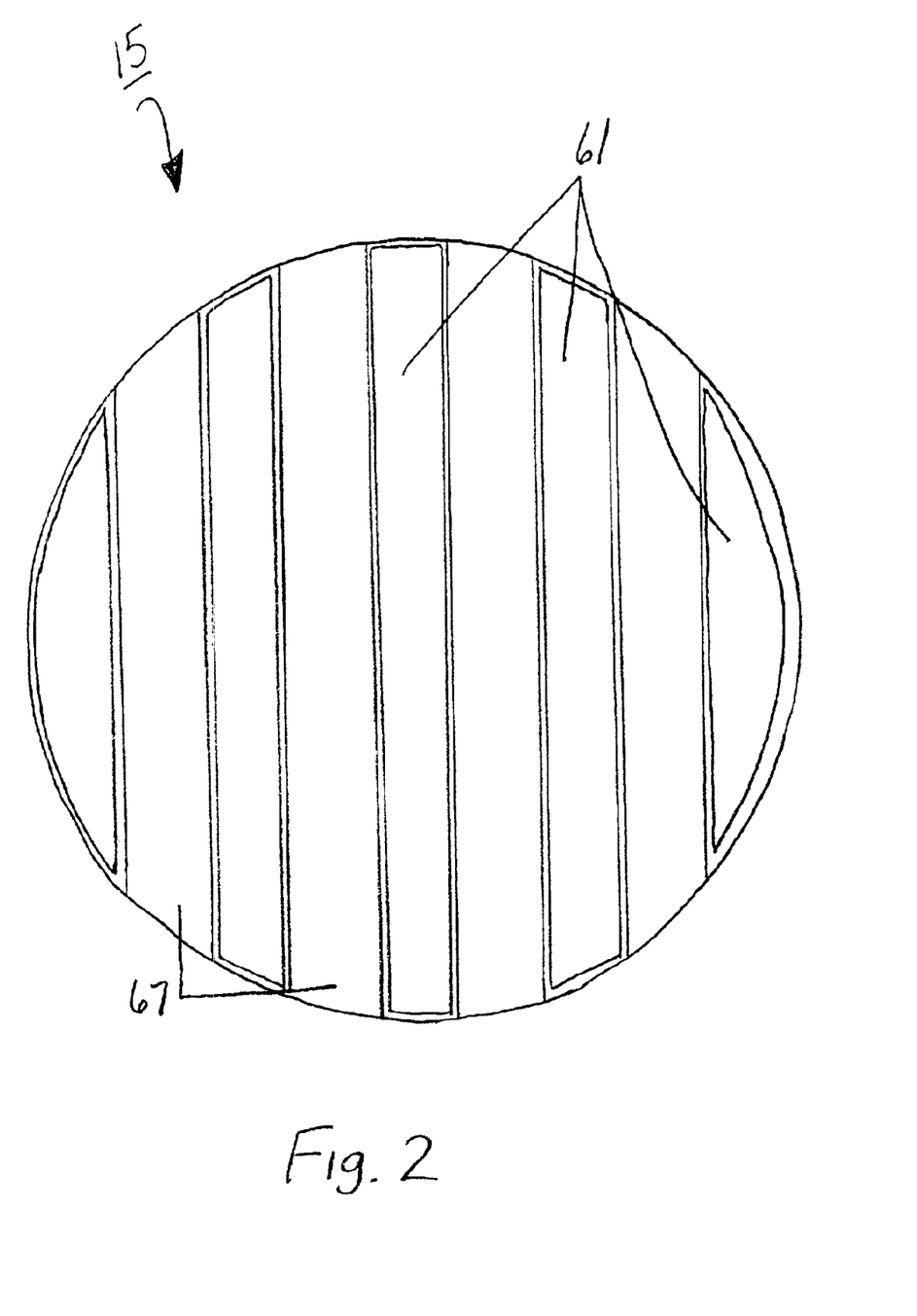
FIG. 2 is a front view of the compression pad shown in FIG. 1.

Referring now to FIG. 2, compression pad 15 is shown in greater detail. Pad 15, which is a compression pad of the type disclosed in commonly assigned co-pending U.S. patent application Ser. No. 09/747,423, which is incorporated herein by reference, includes a number of compressible rubber strips 61 arranged in parallel rows on a folded metal foil 67. Foil 67 is folded in a manner so that alternate faces thereof contact separators 41 and 43 from adjacent cells 13. Strips 61 typically have thickness of about 0.093 inch and are compressed during stack assembly to a thickness of about 0.063 inch. The folded rows of foil 67 are typically made wide enough to accommodate the lateral expansion of strips 61 as they are compressed. Strips 61 are typically made of silicone or urethane rubber, with the particular composition, durometer and dimensions of strips 61 being selected to provide a desired level of mechanical pressure, as required by the particular cell application. Typically, strips 61 are selected to provide pressure from about 100 psig to over 2500 psig.

Referring back to FIG. 1, pad 15 serves to evenly distribute pressure over the entireties of separators 41 and 43 (and, consequently, over the entire active areas of cells 13-1 and 13-2). In addition, the folded metal foil 67 serves to electrically interconnect separators 41 and 43 to provide a continuous electrical path around the rubber strips.

Figure 3:
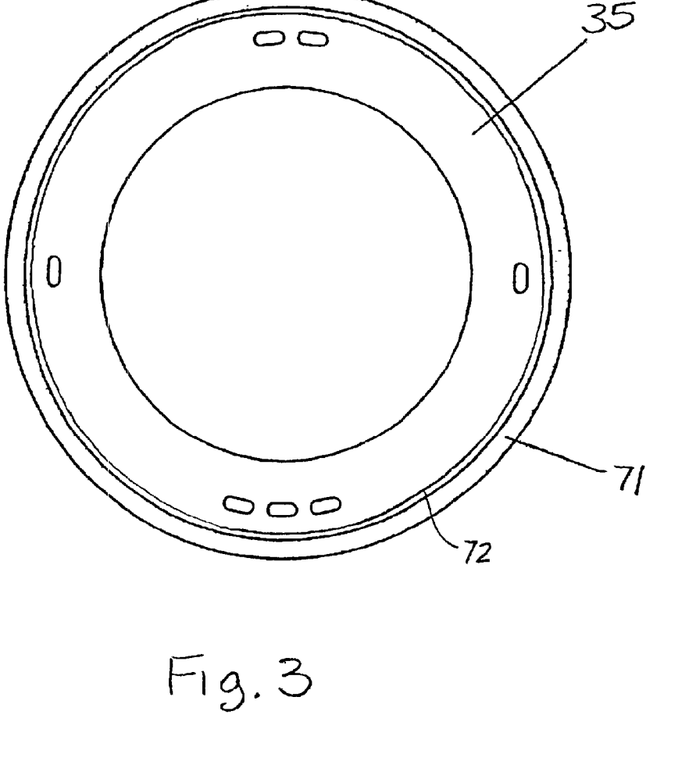
FIG. 3 is a top view of one of the cell frames and the reinforcing member of FIG. 1 shown to illustrate how a small gap is provided between the frame and the reinforcing member at ambient pressure and temperature, said gap being sized to disappear at operating pressure and temperature so that the reinforcing member externally supports the frame.

Stack 11 further comprises a reinforcing member 71. Reinforcing member 71, which in the present embodiment is made of a rigid plastic, is cylindrical in shape to match the shape of cells 13-1 and 13-2 and is dimensioned to peripherally surround both of cells 13-1 and 13-2 in such a way as to be spaced slightly from the cells under ambient temperature and pressure (see gap 72 in FIGS. 1 and 3) and yet so as to provide external support thereto (and, in particular, to provide support to frames 35 and 37) when the frames are expanded by the operating fluid pressure and/or temperature.

Figure 4:
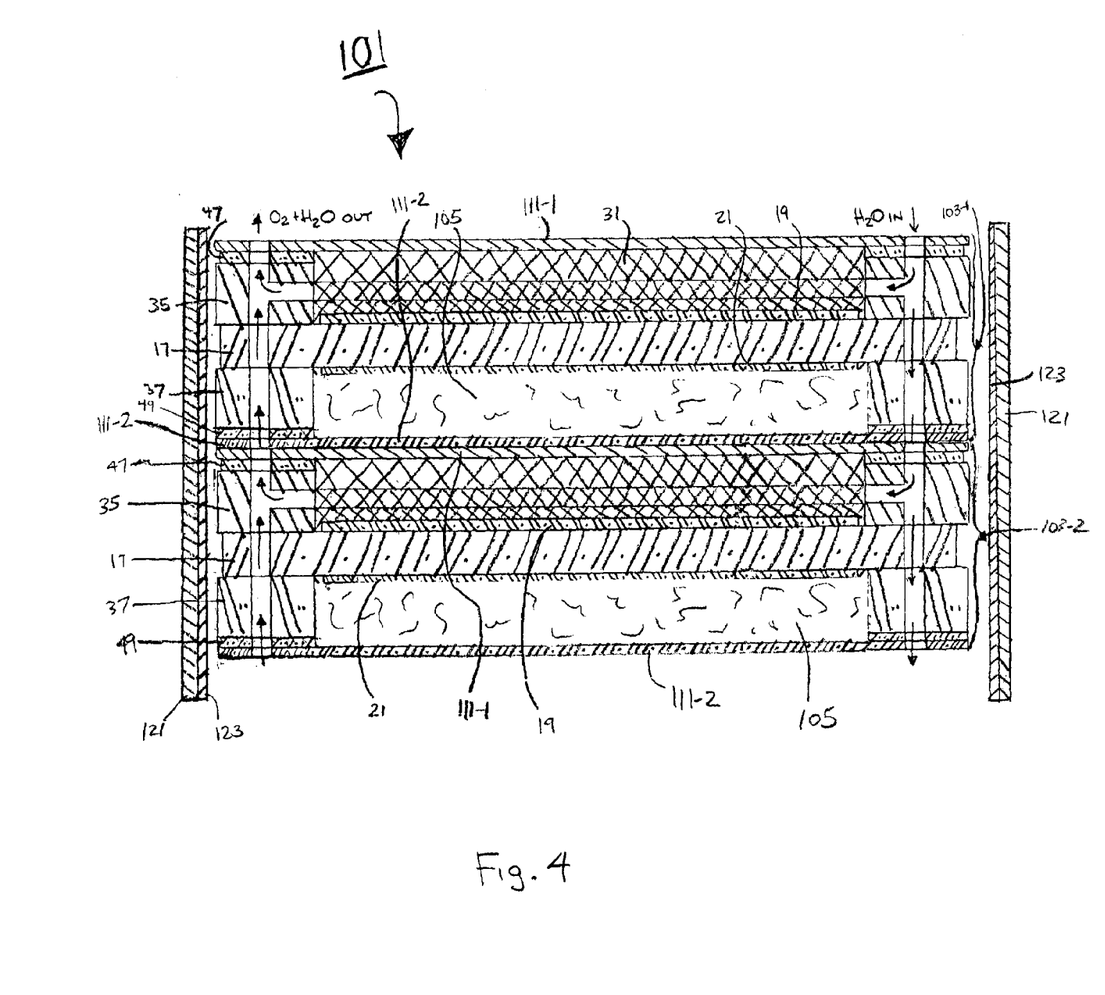
FIG. 4 is a schematic section view of a second embodiment of a PEM electrochemical cell stack constructed according to the teachings of the present invention.

Referring now to FIG. 4, there is shown a schematic section view of a second embodiment of a PEM electrochemical cell stack constructed according to the teachings of the present invention, said PEM electrochemical cell stack being represented generally by reference numeral 101.

Stack 101 is similar in certain respects to stack 11. For instance, stack 101 comprises a pair of cells 103-1 and 103-2 arranged in series in a bipolar configuration (it being understood that stack 101 may be modified to include up to one hundred or more cells 103 arranged in series in a bipolar configuration). Each cell 103 comprises a proton exchange membrane 17, an anode 19 positioned along one face of proton exchange membrane 17, and a cathode 21 positioned along the other face of proton exchange membrane 17. A first platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17. Each cell 103 also comprises a metal screen 31 placed in contact with the outer face of anode 19, a pair of polysulfone cell frames 35 and 37, and a trio of plastic gaskets 47, 48 and 49.

Stack 101, however, differs notably from stack 11 in that stack 101 does not include screen 33, but rather, in its place comprises an electrically-conductive, compressible (i.e., spring-like), porous pad 105. In the present embodiment, pad 105 is a porous mat of randomly-arranged graphite fibers, said porous mat having a density of about 0.2–0.55 g/cm$^3$ and a relaxed or decompressed thickness of about 0.08 inch (Spectracarb Corporation, Lawrence, Mass.). It should be understood, however, that pad 105 may be made of materials other than carbon fibers, provided that the resulting product possesses sufficient porosity, electrical conductivity and compressibility.

Because pad 105 is compressible up to differential pressures of about 400 psi, one advantage of stack 101, as compared to stack 11, is that compression pad 15 may be omitted from stack 101, thereby resulting in a reduction in cost and weight to stack 101. In addition, because pad 105 is unlikely to experience fretting corrosion, separator plate 45 may also be omitted from stack 101, thereby resulting in a further reduction in cost and weight to stack 101. Moreover, pad 105, itself, is typically lighter and cheaper than multi-layer metal screen 31, which is typically made of zirconium and which requires the welding together of its component layers. (In addition, platinum plating is also often applied to screen 31 to minimize contact resistance.) Furthermore, unlike metal screen 31, pad 105 is unlikely to become embrittled due to prolonged exposure to hydrogen gas. Lastly, pad 105 may be impregnated with polymeric or elastomeric materials, such as Teflon, Kynar, fluoroelastomers, ionomers (e.g., Nafion), to enhance its structural integrity and spring rate, without sacrificing other essential properties, such as high conductivity and porosity.

Stack 101 further differs from stack 11 in that stack 101 includes a pair of straight metal foil separators 111-1 and 111-2, instead of a straight separator 41 and a bent separator 43, separator 43 being bent to accommodate compression pad 15.

Stack 101 still further differs from stack 11 in that stack 101 includes a reinforcing member 121 made of metal and an electrically-insulating layer 123 interposed between reinforcing member 121 and cells 103-1 and 103-2, layer 123 preferably being made of a thin, high-dielectric plastic film, such as Mylar or the like. (Although not shown, additional insulating material is preferably provided on the ends of reinforcing member 121.) Member 121 and layer 123 are sized to provide support to the exterior dimensions of cells 103-1 and 103-2 when the stack is operated at design temperature and fluid pressure.

As can readily be appreciated, reinforcing member 121 and layer 123 of stack 101 could be replaced with reinforcing member 71 of stack 11 and vice versa.

Figure 5:
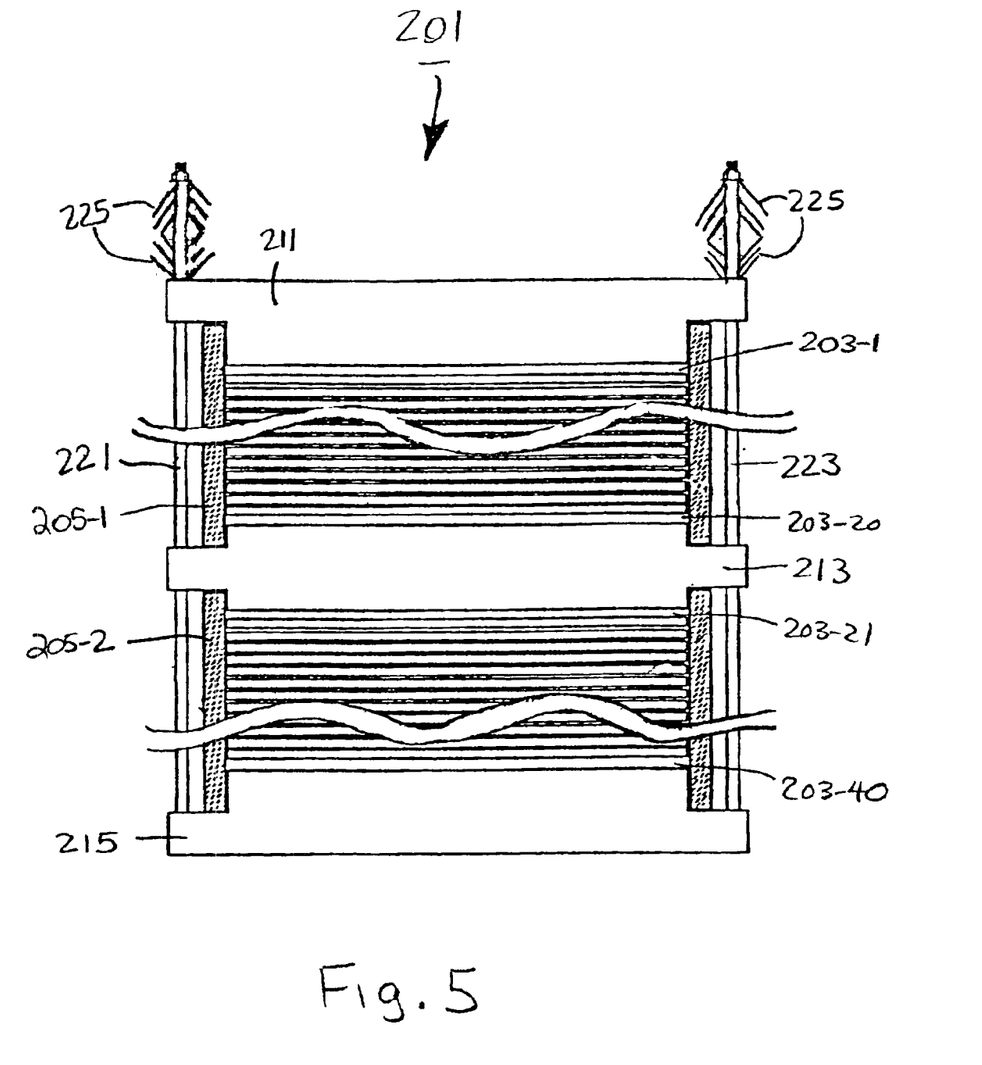
FIG. 5 is a fragmentary schematic front view of a third embodiment of a PEM electrochemical cell stack constructed according to the teachings of the present invention, the reinforcing members of said cell stack being shown in section to reveal the individual cells surrounded thereby, said cell stack also comprising a central current plate allowing current to be fed to two separate sub-stacks with the cell stack.

Referring now to FIG. 5, there is shown a schematic front view of a third embodiment of a PEM electrochemical cell stack constructed according to the teachings of the present invention, said PEM electrochemical cell stack being represented generally by reference numeral 201.

Stack 201 is similar in certain respects to stack 11, stack 201 comprising forty cells 203-1 through 203-40, each of cells 203-1 through 203-40 being identical to cells 13-1 and 13-2 of stack 11. Cells 203-1 through 203-20 are surrounded by a first reinforcing member 205-1, and cells 203-21 through 203-40 are surrounded by a second reinforcing member 205-2. Reinforcing members 205-1 and 205-2 are made of metal, preferably stainless steel. Electrically-insulating material (not shown) is positioned between each reinforcing member 205 and its corresponding assembly of twenty cells 203 and is also positioned at the ends of each reinforcing member 205.

Figure 6A:
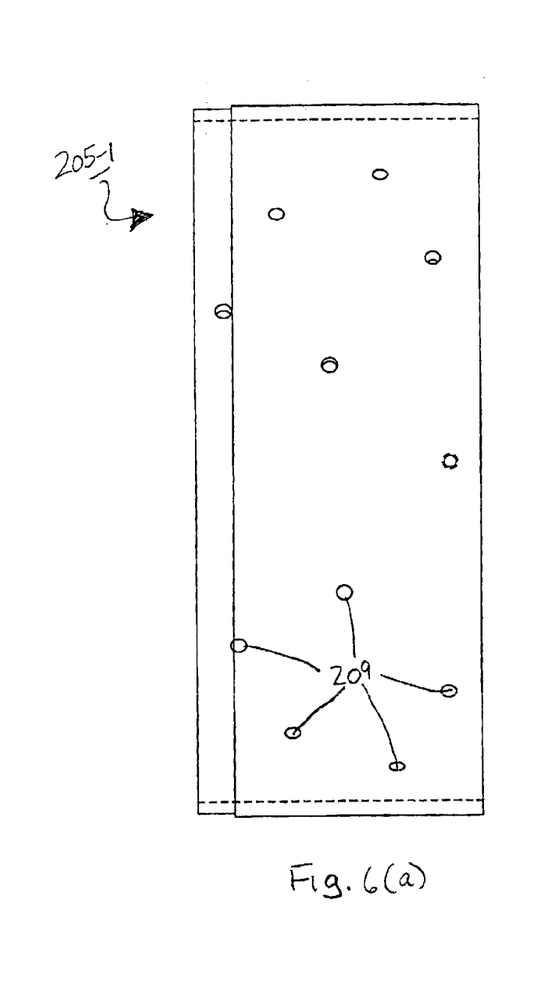
FIGS. 6(a) and 6(b) are front and rear views, respectively, of one of the reinforcing members of FIG. 5.
Figure 6B:
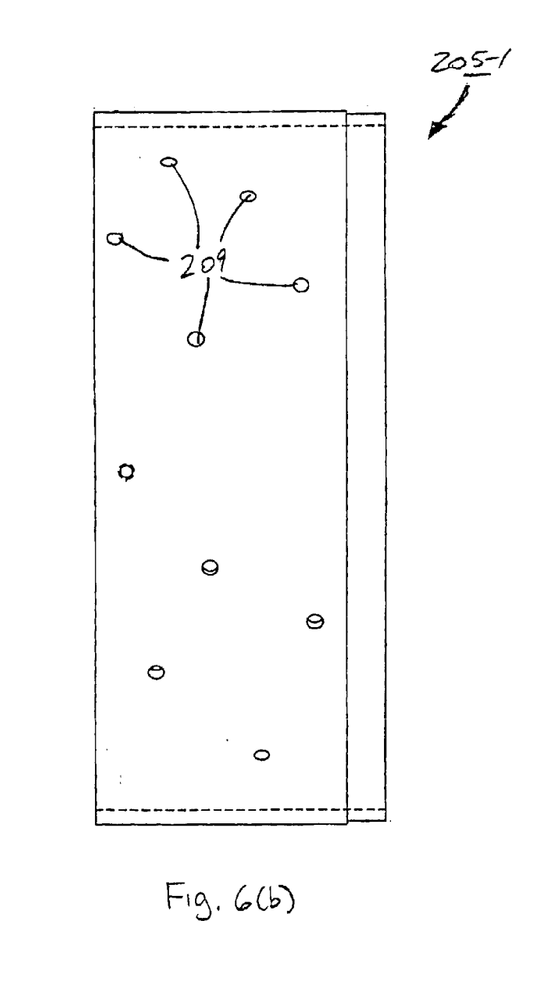

Referring now to FIGS. 6(a) and 6(b), there are shown front and rear views, respectively, of reinforcing member 205-1 (reinforcing member 205-2 being identical to reinforcing member 205-1). As can be seen, reinforcing member 205 is provided with a plurality of vents 209 positioned at various points along its length and around its perimeter to permit the escape therethrough of any leakage fluids from cells 203 and to permit access to cells 203 so that individual cell voltage measurements can be performed.

Referring back now to FIG. 5, stack 201 can be seen to further include a top plate 211, a middle plate 213 and a bottom plate 215, cells 203-1 through 203-20 being sandwiched between top plate 211 and middle plate 213, cells 203-21 through 203-40 being sandwiched between middle plate 213 and bottom plate 215. Plates 211 and 213 are slidably mounted on a pair of tie rods 221 and 223. The bottom ends of rods 221 and 223 are fixed to bottom plate 215, and Belleville spring washers 225 are mounted on top of rods 221 and 223 to urge plate 211 downwardly towards plate 215 in order to compress the two assemblies of cells 203. In the present embodiment, all of plates 211, 213 and 215 are electrically conductive and the two 20-cell assemblies are electrically arranged in parallel, with plate 213 serving as a positive terminal and plates 211 and 215 serving as negative terminals. It should be understood, however, that stack 201 could readily be modified so that the two 20-cell assemblies are electrically arranged in series (e.g, by having plate 215 serve as a negative terminal, having plate 211 serve as a positive terminal and eliminating plate 213).

The following example is provided for illustrative purposes only and is in no way intended to limit the scope of the present invention:

EXAMPLE 1

A 40-cell electrolysis stack having the same overall construction of stack 201 was constructed. The average ionic resistance of the 0.3 ft$^2$ active area cells at ambient temperature was 1 milliohm per cell. There was no cell shorting, and the stack sealed internally and externally to pressures of 900 psi. Also, the cell was leak tight at a differential pressure of 900 psi across the membrane and electrode assemblies. The stack was subsequently operated at a temperature of 120° F. to 130° F. for over 200 hours at current densities of 0 to 2000 A/ft$^2$ with hydrogen pressure up to 900 psig. The reinforcing member retained the thin plastic cell frames at high internal pressure without incident.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochemical cell stack comprising:
   (a) a first proton exchange membrane (PEM) electrochemical cell, said first PEM electrochemical cell comprising a first cell frame;
   (b) a second PEM electrochemical cell, said first and second PEM electrochemical cells being stacked axially in a bipolar configuration, said second PEM electrochemical cell comprising a second cell frame; and
   (c) a reinforcing member peripherally surrounding both said first cell frame of said first PEM electrochemical cell and said second cell frame of said second PEM electrochemical cell, said reinforcing member being a rigid member dimensioned to provide external radial support to said first and second cell frames.

2. The electrochemical cell stack as claimed in claim 1 wherein said first and second cell frames are cylindrical in shape and wherein said reinforcing member is cylindrical in shape.

3. The electrochemical cell stack as claimed in claim 2 wherein said reinforcing member is made of a rigid plastic.

4. The electrochemical cell stack as claimed in claim 2 wherein said reinforcing member is made of a metal, said electrochemical cell stack further comprising electrically insulating material interposed between said reinforcing member and said first and second cell frames.

5. The electrochemical cell stack as claimed in claim 4 wherein said reinforcing member is made of stainless steel.

6. The electrochemical cell stack as claimed in claim 2 wherein said reinforcing member is provided with a plurality of vents.

7. An electrochemical cell stack comprising:
   (a) a first proton exchange membrane (PEM) electrochemical cell, said first PEM electrochemical cell comprising a first cell frame;
   (b) a second PEM electrochemical cell, said first and second PEM electrochemical cells being cylindrical in shape and stacked axially in a bipolar configuration, said second PEM electrochemical cell comprising a second cell frame; and
   (c) a reinforcing member peripherally surrounding both said first cell frame of said first PEM electrochemical cell and said second cell frame of said second PEM electrochemical cell, said reinforcing member being made of a rigid plastic, cylindrical in shape, and dimensioned to provide external radial support to said first and second cell frames, wherein said reinforcing member is sized to be spaced from said first and second cell frames at ambient temperature and pressure and in contact with said first and second cell frames when expanded at operating temperature and pressure so as to reduce frame stress.

8. An electrochemical cell stack comprising:
   (a) a first proton exchange membrane (PEM) electrochemical cell, said first PEM electrochemical cell comprising a first cell frame, said first cell frame being cylindrical in shape;
   (b) a second PEM electrochemical cell, said first and second PEM electrochemical cells being stacked in series in a bipolar configuration, said second PEM electrochemical cell comprising a second cell frame, said second cell frame being cylindrical in shape; and
   (c) a reinforcing member peripherally surrounding both said first cell frame of said first PEM electrochemical cell and said second cell frame of said second PEM electrochemical cell, said reinforcing member being cylindrical in shape and dimensioned to provide external support to said first and second cell frames, wherein said reinforcing member is provided with a plurality of vents and wherein said vents are distributed around the periphery of said reinforcing member.

9. An electrochemical cell stack comprising:
   (a) a first proton exchange membrane (PEM) electrochemical cell, said first PEM electrochemical cell comprising
      (i) first and second separators, said first and second separators being electrically conductive, being spaced apart from one another and being generally parallel to one another;
      (ii) a first proton exchange membrane disposed between said first and second separators;
      (iii) a first anode, said first anode being positioned between said first proton exchange membrane and said first separator and being electrically coupled to said first proton exchange membrane;
      (iv) a first cathode, said first cathode being positioned between said proton exchange membrane and said second separator and being electrically coupled to said first proton exchange membrane;
      (v) first electrically-conductive means for forming a fluid cavity between said first anode and said first separator;
      (vi) second electrically-conductive means for forming a fluid cavity between said first cathode and said second separator;
      (vii) a first pair of cell frames, one of said cell frames being in peripheral contact with said first electrically-conductive means, the other of said cell frames being in peripheral contact with said second electrically-conductive means;
   (b) a second PEM electrochemical cell, said first and second PEM electrochemical cells being stacked axially in a bipolar configuration, said second PEM electrochemical cell comprising
      (i) third and fourth separators, said third and fourth separators being electrically conductive, being spaced apart from one another and being generally parallel to one another;
      (ii) a second proton exchange membrane disposed between said third and fourth separators;
      (iii) a second anode, said second anode being positioned between said second proton exchange membrane and said third separator and being electrically coupled to said second proton exchange membrane;
      (iv) a first cathode, said first cathode being positioned between said second proton exchange membrane and said fourth separator and being electrically coupled to said second proton exchange membrane;
      (v) third electrically-conductive means for forming a fluid cavity between said second anode and said third separator;
      (vi) fourth electrically-conductive means for forming a fluid cavity between said second cathode and said fourth separator;
      (vii) a second pair of cell frames, one of said cell frames being in peripheral contact with said third electrically-conductive means, the other of said cell frames being in peripheral contact with said fourth electrically-conductive means;
   (c) a reinforcing member peripherally surrounding both said first pair of cell frames and said second pair of cell frames, said reinforcing member being dimensioned to provide external radial support to said first and second pairs of cell frames.

10. The electrochemical cell stack as claimed in claim 9 wherein said first and second pairs of cell frames are cylindrical in shape and wherein said reinforcing member is cylindrical in shape.

11. The electrochemical cell stack as claimed in claim 10 wherein said reinforcing member is made of a rigid plastic.

12. The electrochemical cell stack as claimed in claim 11 wherein said reinforcing member is sized to be spaced from said first and second cell frames at ambient temperature and pressure and in contact with said first and second cell frames when expanded at operating temperature and pressure so as to reduce frame stress.

13. The electrochemical cell stack as claimed in claim 10 wherein said reinforcing member is made of a metal, said electrochemical cell stack further comprising electrically insulating material interposed between said reinforcing member and said first and second cell frames.

14. The electrochemical cell stack as claimed in claim 13 wherein said reinforcing member is made of stainless steel.

15. The electrochemical cell stack as claimed in claim 10 wherein said reinforcing member is provided with a plurality of vents.

16. The electrochemical cell stack as claimed in claim 9 wherein each of said first electrically-conductive means for forming a fluid cavity between said first anode and said first separator and said third electrically-conductive means for forming a fluid cavity between said second anode and said third separators is a metal screen.

17. The electrochemical cell stack as claimed in claim 9 further comprising a compression pad interposed between and electrically interconnecting said second separator and said third separator.

18. An electrochemical cell stack comprising:
(a) a first proton exchange membrane (PEM) electrochemical cell, said first PEM electrochemical cell comprising
  (i) first and second separators, said first and second separators being electrically conductive, being spaced apart from one another and being generally parallel to one another;
  (ii) a first proton exchange membrane disposed between said first and second separators;
  (iii) a first anode, said first anode being positioned between said first proton exchange membrane and said first separator and being electrically coupled to said first proton exchange membrane;
  (iv) a first cathode, said first cathode being positioned between said proton exchange membrane and said second separator and being electrically coupled to said first proton exchange membrane;
  (v) first electrically-conductive means for forming a fluid cavity between said first anode and said first separator;
  (vi) second electrically-conductive means for forming a fluid cavity between said first cathode and said second separator;
  (vii) a first pair of cell frames, one of said cell frames being in peripheral contact with said first electrically-conductive means, the other of said cell frames being in peripheral contact with said second electrically-conductive means, each of said first pair of cell frames being cylindrical in shape;
(b) a second PEM electrochemical cell, said first and second PEM electrochemical cells being stacked in series in a bipolar configuration, said second PEM electrochemical cell comprising
  (i) third and fourth separators, said third and fourth separators being electrically conductive, being spaced apart from one another and being generally parallel to one another;
  (ii) a second proton exchange membrane disposed between said third and fourth separators;
  (iii) a second anode, said second anode being positioned between said second proton exchange membrane and said third separator and being electrically coupled to said second proton exchange membrane;
  (iv) a first cathode, said first cathode being positioned between said second proton exchange membrane and said fourth separator and being electrically coupled to said second proton exchange membrane;
  (v) third electrically-conductive means for forming a fluid cavity between said second anode and said third separator;
  (vi) fourth electrically-conductive means for forming a fluid cavity between said second cathode and said fourth separator;
  (vii) a second pair of cell frames, one of said cell frames being in peripheral contact with said third electrically-conductive means, the other of said cell frames being in peripheral contact with said fourth electrically-conductive means, each of said second pair of cell frames being cylindrical in shape;
(c) a reinforcing member peripherally surrounding both said first pair of cell frames and said second pair of cell frames, said reinforcing member being cylindrical in shape and dimensioned to provide external support to said first and second pairs of cell frames, wherein said reinforcing member is provided with a plurality of vents and wherein said vents are distributed around the periphery of said reinforcing member.

19. An electrochemical cell stack comprising:
(a) a first proton exchange membrane (PEM) electrochemical cell, said first PEM electrochemical cell comprising
  (i) first and second separators, said first and second separators being electrically conductive, being spaced apart from one another and being generally parallel to one another;
  (ii) a first proton exchange membrane disposed between said first and second separators;
  (iii) a first anode, said first anode being positioned between said first proton exchange membrane and said first separator and being electrically coupled to said first proton exchange membrane;
  (iv) a first cathode, said first cathode being positioned between said proton exchange membrane and said second separator and being electrically coupled to said first proton exchange membrane;
  (v) first electrically-conductive means for forming a fluid cavity between said first anode and said first separator, wherein said first electrically-conductive means is a metal screen;
  (vi) second electrically-conductive means for forming a fluid cavity between said first cathode and said second separator, wherein said second electrically-conductive means is a compression pad, said compression pad being electrically-conductive, spring-like and porous and comprising a mat of carbon fibers having a density of about 0.2–0.55 g/cm$^3$;
  (vii) a first pair of cell frames, one of said cell frames being in peripheral contact with said first electrically-conductive means, the other of said cell frames being in peripheral contact with said second electrically-conductive means;
(b) a second PEM electrochemical cell, said first and second PEM electrochemical cells being stacked in series in a bipolar configuration, said second PEM electrochemical cell comprising
  (i) third and fourth separators, said third and fourth separators being electrically conductive, being spaced apart from one another and being generally parallel to one another;
  (ii) a second proton exchange membrane disposed between said third and fourth separators;
  (iii) a second anode, said second anode being positioned between said second proton exchange membrane and said third separator and being electrically coupled to said second proton exchange membrane;
  (iv) a first cathode, said first cathode being positioned between said second proton exchange membrane and said fourth separator and being electrically coupled to said second proton exchange membrane;
  (v) third electrically-conductive means for forming a fluid cavity between said second anode and said third separator, wherein said third electrically-conductive means is a metal screen;
  (vi) fourth electrically-conductive means for forming a fluid cavity between said second cathode and said fourth separator, wherein said fourth electrically-conductive means is a compression pad, said compression pad being electrically-conductive, spring-like and porous and comprising a mat of carbon fibers having a density of about 0.2–0.55 g/cm$^3$;
  (vii) a second pair of cell frames, one of said cell frames being in peripheral contact with said third electrically-conductive means, the other of said cell frames being in peripheral contact with said fourth electrically-conductive means;
  (c) a reinforcing member peripherally surrounding both said first pair of cell frames and said second pair of cell frames, said reinforcing member being dimensioned to provide external support to said first and second pairs of cell frames.

20. The electrochemical cell stack as claimed in claim 19 wherein said second separator is in direct contact with said third separator.

21. An electrochemical cell stack comprising:
  (a) a first plurality of proton exchange membrane (PEM) electrochemical cells stacked axially in a bipolar configuration, each of said first plurality of PEM electrochemical cells comprising a cell frame;
  (b) a first reinforcing member peripherally surrounding said cell frames of said first plurality of PEM electrochemical cells, said first reinforcing member being a rigid member dimensioned to provide external radial support to said cell frames of said first plurality of PEM electrochemical cells;
  (c) a second plurality of PEM electrochemical cells stacked axially in a bipolar configuration, each of said second plurality of PEM electrochemical cells comprising a cell frame; and
  (d) a second reinforcing member peripherally surrounding said cell frames of said second plurality of PEM electrochemical cells, said second reinforcing member being dimensioned to provide external radial support to said cell frames of said second plurality of PEM electrochemical cells.

22. An electrochemical cell stack comprising:
  (a) a first plurality of proton exchange membrane (PEM) electrochemical cells stacked axially in a bipolar configuration, each of said first plurality of PEM electrochemical cells comprising a cell frame,
  (b) a first reinforcing member peripherally surrounding said cell frames of said first plurality of PEM electrochemical cells, said first reinforcing member being dimensioned to provide external radial support to said cell frames of said first plurality of PEM electrochemical cells,
  (c) a first plate,
  (d) a second plate, wherein each of said first plate and said second plate is electrically conductive, wherein said first plurality of PEM electrochemical cells are disposed between said first plate and said second plate, and
  (e) means for urging said first plate and said second plate towards one another.

23. The electrochemical cell stack as claimed in claim 22 further comprising a second plurality of proton exchange membrane (PEM) electrochemical cells stacked axially in a bipolar configuration, each of said second plurality of PEM electrochemical cells comprising a cell frame, a second reinforcing member peripherally surrounding said cell frames of said second plurality of PEM electrochemical cells, said second reinforcing member being dimensioned to provide external radial support to said cell frames of said second plurality of PEM electrochemical cells, a third plate, said third plate being electrically conductive, said second plurality of PEM electrochemical cells being disposed between said second plate and said third plate, and means for urging said second plate and said third plate towards one another.

* * * * *